Patented Dec. 13, 1932

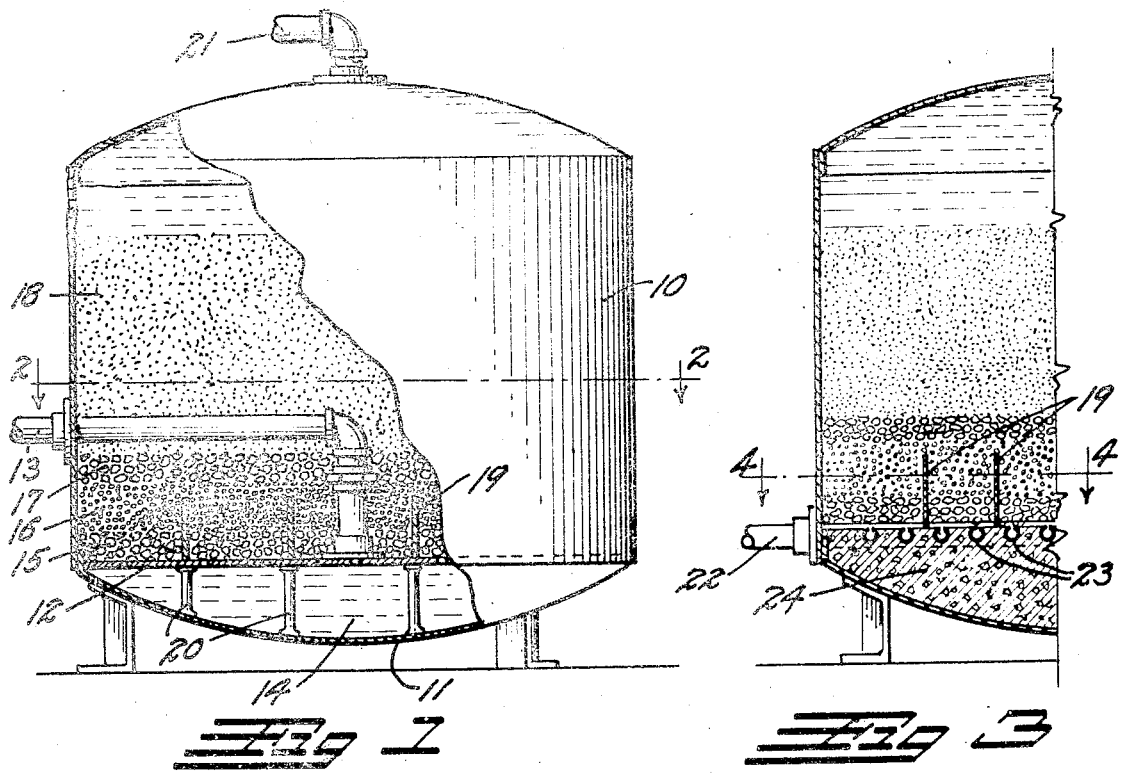
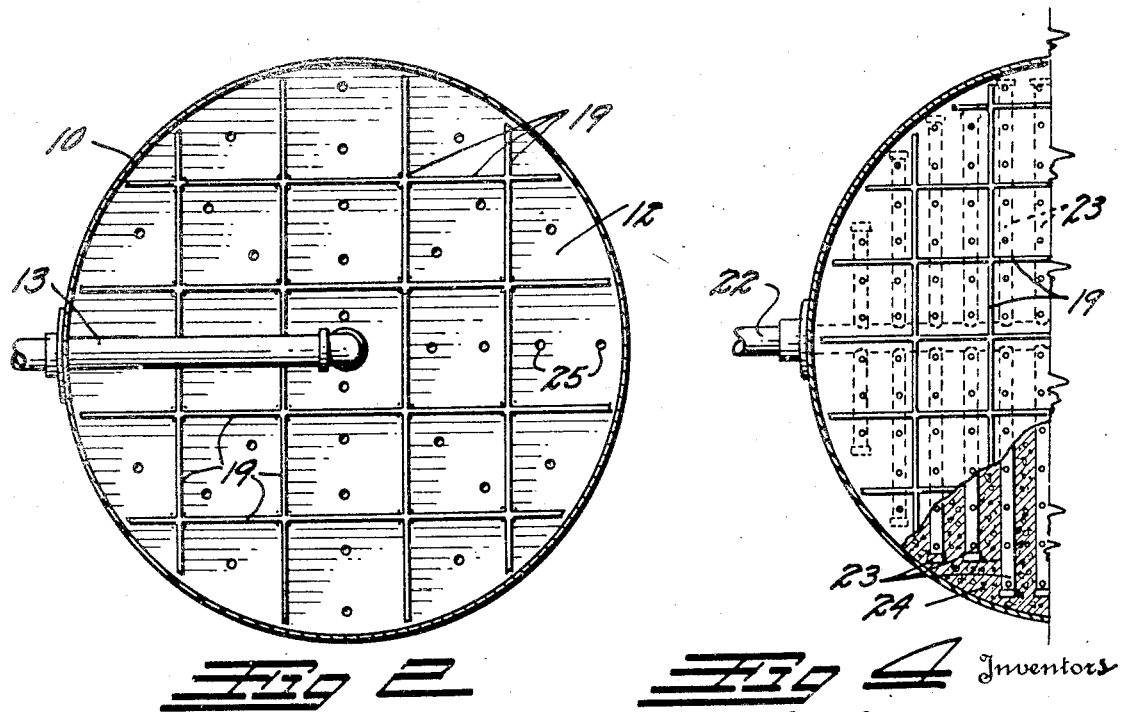

1,891,061

UNITED STATES PATENT OFFICE

ROBERT OWEN FRIEND AND JOHN ARTHUR MONTGOMERY, OF CHICAGO, ILLINOIS

WATER TREATING DEVICE

Application filed June 27, 1931. Serial No. 547,270.

This invention relates more particularly to the construction of water softeners of the zeolite type but will also be found valuable in filter tanks and other water treating devices. One of the great problems, particularly in zeolite water softeners, is to prevent channeling of the zeolite bed. The ideal condition would be a bed through which the water would flow uniformly at all points. Present water softeners fall far short of this ideal since the water will follow the path of least resistance and soon form channels through the bed. The major portion of the water will flow through these channels thereby avoiding the contact with the softening mineral necessary for efficient softening and regeneration.

In our prior Patents No. 1,783,466 and No. 1,787,698 we have shown methods for increasing the uniformity of flow through the zeolite. We have found that even these methods are not perfectly satisfactory. In Patent No. 1,783,466 we have disclosed a series of intersecting plates dividing the gravel bed into a series of cells. The plates as disclosed were not perfectly satisfactory for two reasons; first, the water would follow along the face of the plates since this was the most open channel, thereby avoiding contact with the mineral in the center portion of each cell; second, the plates could not be secured to the dispersion plate of the tank since they would interfere with cleaning and if not secured to the bottom of the tank they would gradually work up through the bed away from the bottom allowing cross channels to form.

The principal object of this invention is to overcome the above noted objections to the use of laterally extending plates for dividing the gravel bed into cells.

Another object of the invention is to provide a uniformity of flow from all the orifices, either in a perforated dispersion plate or in perforated pipe grids, by forming these perforations with a total opening area less than the area of the feed pipe so that a back pressure will be produced which will be uniform at each orifice.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side elevation partly in section, of a typical softening tank of the zeolite type provided with a perforated bottom.

Fig. 2 is a horizontal section therethrough taken on the line 2—2, Fig. 1, with the mineral and gravel bed removed.

Fig. 3 is a fragmentary vertical section through a softener of the type having a pipe distribution system in place of a perforated plate.

Fig. 4 is a fragmentary horizontal section taken on the line 4—4, Fig. 3.

The usual softening tank of the type illustrated in Figs. 1 and 2 comprises a tank proper, 10, having a perforated dispersion plate 12, positioned above a convex bottom 11.

During the softening process hard water is fed into the tank 10 through a feed pipe 13, which opens through the dispersion plate 12 to a pressure chamber 14 between the plate 12 and the bottom 11. As claimed in prior Patent No. 1,787,698 a first layer 15, of relatively coarse gravel, is placed upon the plate 12. A second layer 16, of relatively fine gravel, is placed upon the layer 15 and the second layer 16 is preferably covered with a third layer 17, of relatively coarse gravel. The zeolite mineral, indicated at 18, is placed upon the topmost layer 17 of the gravel bed.

A grid of laterally-crossing partition plates 19 rests upon the plate 12. As before stated, it has been found that the water will follow up the faces of the plates 19 thereby reaching the mineral bed 18 in widely separated channels. One of the objects of this invention is to avoid this objectionable feature. This is accomplished by having the upper edges of the plates 19 below the top of the fine gravel layer 16 as shown in Fig. 1. This allows a continuous layer of fine gravel to lie over the entire grid of plates so that any water flowing up the face of the plates will be dispersed by the layer of fine gravel above the plates. During the regenerating process water flowing downwardly through the coarse gravel 17 and the overlying layer of the fine gravel 16 will be broken into a multitude of small streams which will not reach the plate surface to form channels. Therefore, the feature of having the fine gravel bed or layer overlie the partition plates is one of the important features of this invention.

Another objection to the use of partition plates, as above stated, lies in the fact that the plates will move upwardly in the bed. This movement is caused by the pressure in the chamber 14 acting at times to slightly bow the dispersion plate 12 upwardly so that it in turn will force the partition plates 19 upwardly. When the dispersion plate 12 returns to its normal position after the pressure has decreased the partition plates will not follow and sand and gravel will form between them and the plate 12. This sand and gravel acts to force the plates 19 still further upwardly on the next bowing or vibration of the plate 12. This process is continuous until the plates are raised well above the plate 12. When in the latter position the water can flow freely under the partitions 19 to find channels of least resistance resulting in channel flow through the mineral bed 18. The plates 19 can not be permanently fastened to the plate 12 to avoid this since they must be removed for cleaning purposes.

We have found that the above difficulty can be entirely eliminated by providing a rigid support for the partition, that is, preventing bowing or vibration of the plate 12. Many means could be employed to prevent this bowing or vibration. One of the most satisfactory means appears to be to secure the plate 12 to the bottom 11 at a plurality of points throughout their areas by means of suitable stay bolts 20. Sufficient stay bolts should be employed to prevent any bowing of the plate 12 under the operating pressures used. It has been found highly satisfactory to employ a number of stay bolts equal approximately to the number of intersections formed by the partition plates 19. It can be seen that with the above construction no upward movement will ever be imparted to the plates 19 and they will always lie snugly against the plate 12.

Some water treating devices employ a pipe header and a series of perforated lateral pipes in place of the perforated dispersion plate 12. The principles of this invention apply equally well to the latter type of construction. A typical installation of the latter type is shown in Figs. 3 and 4, in which a header pipe 22 feeds a series of perforated lateral pipes 23. If the pipes 22 and 23 are subject to vibration either from their jets or from outside sources, partition plates 19 placed upon them will move upwardly as in the former type.

We have found that this upward movement can be entirely prevented by eliminating vibration in the pipe system. This can be accomplished as shown in Fig. 3 by casting the entire pipe system into the upper surface of a concrete block 24 poured into the bottom of the tank, thereby applying the same principle of providing means for preventing upward vibration of the dispersion system. The principle of forming the fine gravel bed over the top of the partition plates applies equally well to the latter type of construction.

Channeling is often caused by unequal pressure at the orifices within the dispersion plate 12 or in the pipe system of Fig. 4. We have found that this unequal pressure can be avoided by calculating the total areas of all perforations and maintaining this total area less than the total area of the intake pipes 13 or 22. By this construction a back pressure is built up in the pressure chamber 14 which distributes itself uniformly over the entire chamber and necessarily creates a uniform pressure at each perforation in the plate 12.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for supporting treating material in a water treating device comprising: a dispersion medium for dividing the incoming water into a series of jets; a series of intersecting vertical plates positioned above said dispersion medium so as to divide the area of the latter into a series of cells; and a bed of gravel placed in and over said cells, said bed of gravel having sufficient thickness to extend above the top of said plates.

2. A bed for supporting treating material in a water treating device comprising: a dispersion medium for dividing the incoming water into a series of jets; a series of intersecting vertical plates positioned above said dispersion medium so as to divide the area of the latter into a series of cells; a layer of relatively coarse gravel positioned on said dispersion medium within said cells; a layer of relatively fine gravel positioned on said coarse gravel, said fine gravel layer being of sufficient thickness to extend above the top of said partition plates so as to form a continuous bed thereover.

3. A bed for supporting treating material in a water treating device comprising: a dispersion medium for dividing the incoming water into a series of jets; a series of intersecting vertical plates positioned above said dispersion medium so as to divide the area of the latter into a series of cells; a layer of relatively coarse gravel positioned on said dispersion medium within said cells; a layer of relatively fine gravel positioned on said coarse gravel, said fine gravel layer being of sufficient thickness to extend above the top of said partition plates so as to form a continuous bed thereover; and a third layer of relatively coarse gravel positioned upon said relatively fine gravel so as to hold the latter in place and support the softening mineral.

In testimony whereof, we affix our signatures.

ROBERT OWEN FRIEND.
JOHN ARTHUR MONTGOMERY.